March 19, 1968     I. M. TAFT     3,373,779
SABER SAW EXTENSION
Filed Jan. 21, 1966     2 Sheets-Sheet 1
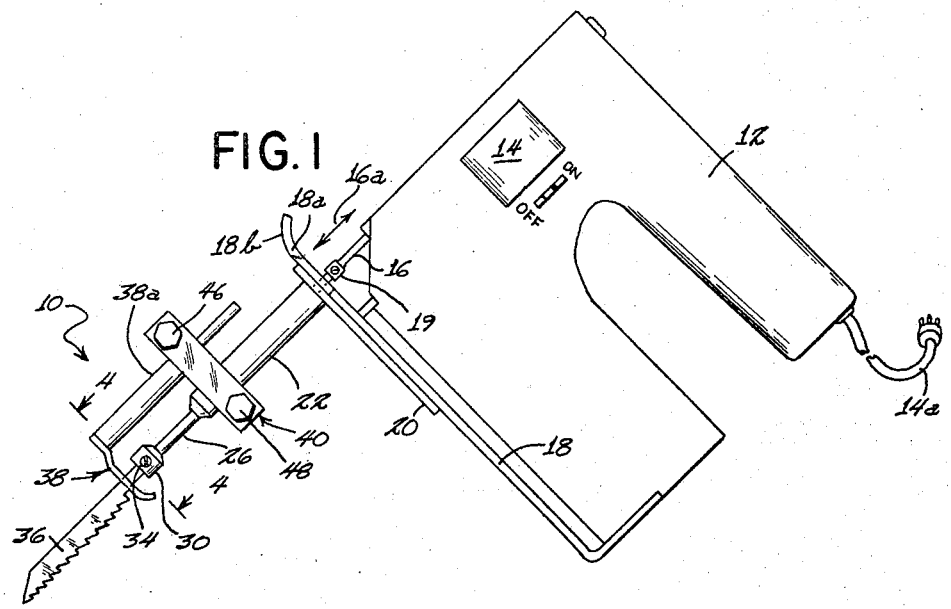
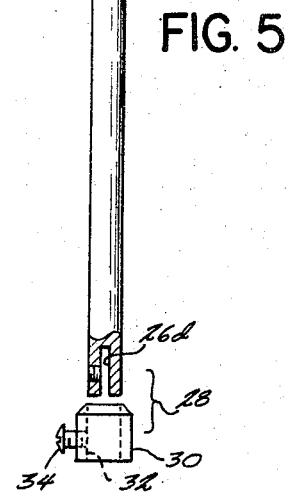
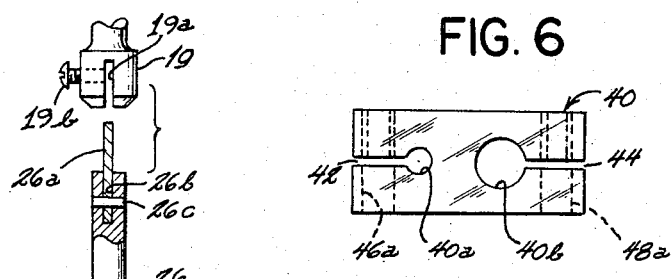
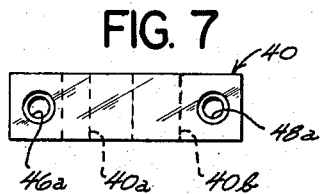
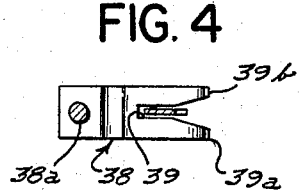
INVENTOR.
IRVIN M. TAFT
BY
*Mark W. Gehan*
ATTORNEY March 19, 1968

I. M. TAFT 3,373,779

SABER SAW EXTENSION

Filed Jan. 21, 1966

INVENTOR.
IRVIN M. TAFT

BY
Mark W. Gehan
ATTORNEY

United States Patent Office 3,373,779
Patented Mar. 19, 1968

3,373,779
SABER SAW EXTENSION
Irvin M. Taft, 928 Euclid, St. Paul, Minn. 55106
Filed Jan. 21, 1966, Ser. No. 522,152
3 Claims. (Cl. 143—68)

ABSTRACT OF THE DISCLOSURE

An attachment extension for a saber saw which increases the reach of the saber saw blade without increasing the length of the blade itself. The extension includes a plate attached to the base plate of the saw with an integral tubular member extending away from the saw slidably supporting an extension shaft. The extension shaft is coupled to the saber saw shaft at one end and is provided with saw blade attaching means at the distal end. An additional foot is attached to the end of the tubular member.

---

The present invention relates generally to power tools and more specifically to an extension device for a saber saw.

The use of power tools has increased in recent years. Craftsmen and handyman alike use such tools to expedite and improve the quality of their work. While power tools such as the saber saw have found general acceptance, certain problems are encountered.

For example, often times the workpiece is in a difficult location and due to the inherent design of the tool i.e. its shape, size, etc., the cutting blade cannot be moved into a proper cutting position.

It is therefore an object of the present invention to provide an extension device for a saber saw which can be easily attached and detached from the saw and one which does not interfere with the normal use of the saw.

Another object of the invention is to provide an inexpensive extension device for a saber saw and one which can be easily manufactured.

Other objects and advantages will become apparent from the following specification and the appended drawings in which;

FIGURE 1 is a side elevational view of the preferred embodiment of the invention attached to the saber saw;

FIGURE 4 is a sectional view of the device of FIGURE 1 as taken generally along, and in the direction of, line 4—4 of that figure;

FIGURE 5 is a detailed view of the extension shaft of the invention in partial section;

FIGURE 6 is a plan view of the clamping bar of the invention and;

FIGURE 7 is a side elevational view of the clamping bar of FIGURE 6.

Figure 2:
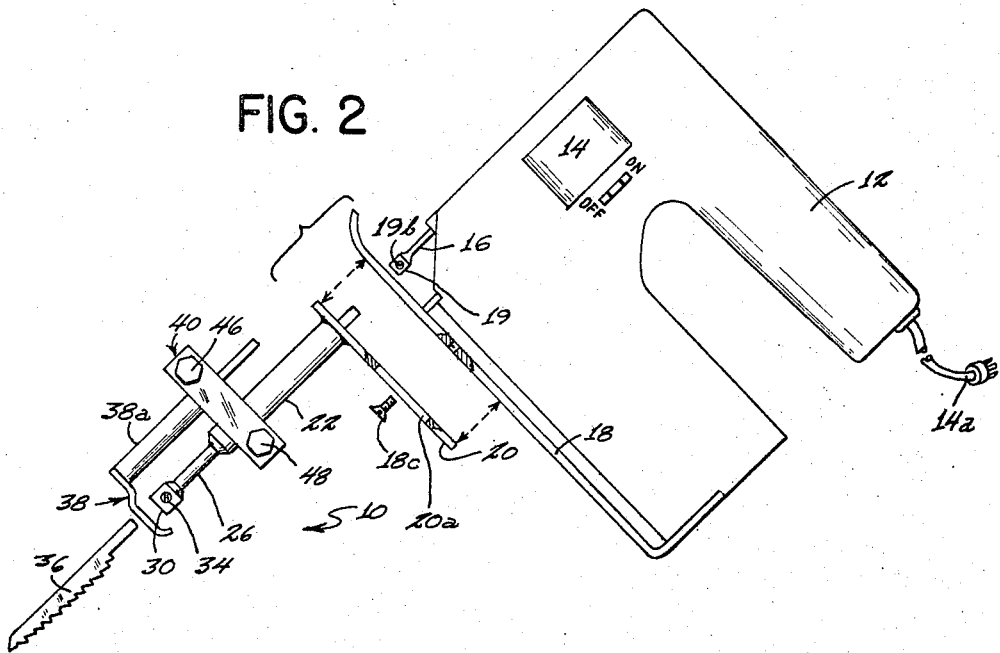
FIGURE 2 is a side elevational view of the device of FIGURE 1 detached from the saber saw.

The saber saw extension is indicated generally by the numeral 10 and is shown in an attached position in FIGURE 1 of the drawings. The saber saw 12 to which the saber saw extension is attached includes a motor 14, a reciprocal shaft 16 and a base plate 18. The shaft 16 of the saber saw 12 includes a blade attaching means 19 which is illustrated in further detail in FIGURE 5. When the saber saw 12 is used a saw blade is inserted in the slot 19a and the set screw 19b is tightened to retain the upper end of the blade in a fixed position. The motor 14 is connected to a suitable electrical source through the cord 14a and through an internal mechanism (not shown) the shaft 16 is reciprocated along its axis as indicated by the arrow 16a.

It will be realized at this point that in normal use of a saber saw the blade shown attached to the instant invention is in reality immediately below the shaft 16 and extends slightly below its base plate 18. When in use, the saber saw 12 rests upon the base plate 18 and the action of the shaft 16 causes the saw blade to be reciprocated to perform the cutting action on a workpiece.

Often times the width of the base plate 18 of the saber saw is substantially the same as the upper portion of the saw which houses the motor and the shaft actuating mechanism. The size of the motor 14 and the associated parts are dependent upon the use requirements of the saber saw and often the width of the saw is such as to obstruct the vision of an operator except he looks forward of the blade through the slot 18a of the integral foot 18b of the base plate 18.

There are times when it is desirable to use the saber saw 12 but its inherent design limitations prevent such use. By providing an extension in the manner of applicant's invention the saber saw can be used. Since such uses occur infrequently permanent modification of the saw is not desired and is not necessary according to applicant's teachings.

The saber saw extension 10 includes an attaching plate 20 having integral therewith an elongated extension rod 22 provided with a central bore 24. The saber saw extension 10 is attached to the saber saw 12 by moving the attaching plate 20 into engagement with the base plate 18 of the saber saw 12 after removing the base plate attaching screw or screws 18c and using the base plate attaching screw or screws 18c to mount the attaching plate 20 to the underside of the base plate 18. To facilitate the latter a slot 20a is provided in the plate 20 in general alignment with the screw or screws 18c. When the attaching plate 20 is attached to the base plate 18 the longitudinal axis of the bore 24 in extension rod 22 is substantially aligned with the central axis of the saber saw shaft 16.

Extending through the bore 24 in rod 22 is an extension shaft 26 which is movable in the bore 24. The extension shaft 26 is slightly longer than the rod 22 and is provided at its upper end with means for attaching the upper end to the saber saw shaft 16. To be more specific, the upper end of shaft 26 is provided with a flat rectangular plate 26a. The plate 26a extends into a slot 26b in the extension shaft 26 and is fixedly secured thereto by a transverse pin 26c. The length of the plate 26a is slightly greater than the depth of the slot 26b causing it to extend upwardly above the shaft 26. The upper end of the plate 26 is designed to fit into the slot 19a of the saber saw shaft 16 and is retained thereto as desired by the set screw 19b. The extension shaft 26 is also provided with a blade attaching means at its lower end as indicated generally by the numeral 28.

A slot 26d is provided in the lower end of shaft 26 and is substantially identical to the slot 19a in the saber saw shaft 16. An annular collar 30 is provided having a bore 32 and a set screw 34 which fits over the lower end of the shaft 26.

The dimensions of slot 20a are such as to receive the upper end of a conventional saw blade 36. The set screw 34 is adjusted in collar 30 to retain the saw blade 36 in position.

An additional foot is provided for supporting the saber saw 12 and saber saw extension 10 and is indicated by the numeral 38. The foot 38 includes the usual blade slot 39 (see FIGURE 4) and has upturned side members 39a and 39b. The foot 38 also has integral therewith a foot shaft 38a which is attached to the previously described extension rod by a clamping block 40. As seen specifically in FIGURES 3, 6 and 7, the clamping bar is a rectangular block having a pair of parallel vertical openings 40a and 40b. The openings 40a and 40b have in communication therewith slots 42 and 44 respectively which extend to the outer ends of the blocks and which represent cutaway portions of the clamping bar 40. Additional openings 46a and 48a extend transversely through the bar 40 in the area of the slots 42 and 44 and each opening is provided with a threaded end for receiving bolts 46 and 48. The bolts 46 and 48 when adjusted tend to reduce the width of the slots 42 and 44 and thus clamp the extension rod 22 and the foot shaft 38a in the openings 40a and 40b.

Figure 3:
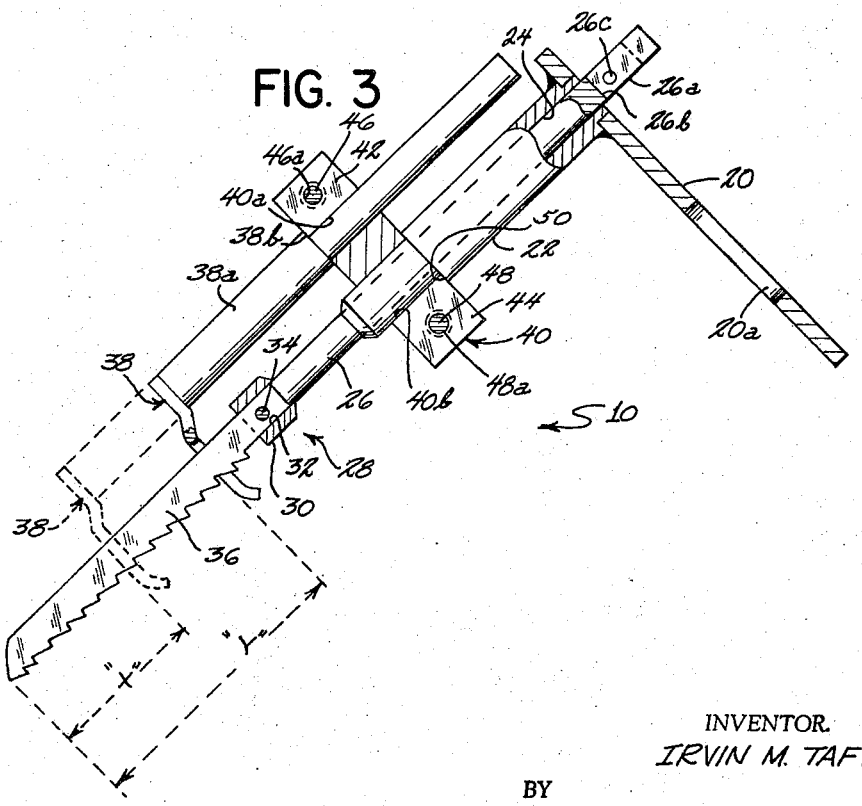
FIGURE 3 is an enlarged side elevational view of the saber saw extension of FIGURE 1 in partial section.

It will be noted in FIGURE 3 that the extension rod 22 has an annular shoulder 50 and that the foot shaft 38a has a similar shoulder 38b. The latter shoulders engage the upper and lowermost surfaces of the bar 40 respectively and determine the prime or mean position of the same.

In some instances however, it is desirable to reduce a portion of the blade 36 that engaged a workpiece. By loosening the bolt 46 the foot shaft 38a can be moved axially along the blade so that only a limited portion of the blade actually engages the workpiece. An example is indicated by the dimensions X and Y in FIGURE 3.

In other instances it may be desirable to mount the saw blade with its cutting surface facing forward. In which case by loosening bolt 48 the clamping bar 40 can be rotated 180° so that the foot is facing forward. The saw blade can then be attached with its cutting teeth or surface facing forward. Also, the shoe 38 may be mounted so that it may be rotated with or without removal of the blade.

Thus from the above description I have provided a saber saw extension which is easily attached and detached from a saber saw. Also I provide a saber saw extension which is simple to construct and one which will not interfere with the conventional use of the saber saw. Furthermore, by positioning the saw blade distal of the saw better visibility is afforded to the operator.

In the above description I have presented a detailed disclosure of the preferred embodiment of my invention together with detailed drawings of how the invention can be practiced, and while certain modifications will undoubtedly occur to those skilled in the art it is my intention to cover all such modifications as evidenced by the scope of the appended claims.

Now therefore I claim:

1. In a saber saw extension device the combination comprising, an attaching plate, an elongated extension rod integral with said plate, said extension rod having an axial bore therein, an extension shaft in said bore, said shaft having means at its one end for attaching said shaft to the movable shaft of a saber saw and means at its opposite end for attaching a blade thereto, a clamping bar on said extension bar, a foot shaft in said clamping bar, said foot shaft spaced apart from said extension bar and having an integral foot thereon, said foot having a slot means therein at least partially surrounding said blade when said blade is attached to said extension shaft.

2. The device of claim 1 wherein said means for attaching said extension shaft to said movable shaft of said saber saw includes a substantially flat plate attached to the end of said extension shaft for mating with the blade attaching means of said movable shaft.

3. The device of claim 1 wherein said blade attaching means on said extension shaft includes an annular collar provided with a set screw therein and wherein said extension shaft is provided with a slot means therein for receiving the upper end of a saw blade.

References Cited
UNITED STATES PATENTS

| | | | |
|---|---|---|---|
| 2,588,477 | 3/1952 | Briggs | 143—68 |
| 2,601,788 | 7/1952 | Parker | 143—68 X |
| 2,954,808 | 10/1960 | Sweeney et al. | 143—68 |

DONALD R. SCHRAN, *Primary Examiner*.